United States Patent Office 3,453,337
Patented July 1, 1969

3,453,337
FLUORINATION OF HALOGENATED
ORGANIC COMPOUNDS
Royston Henry Bennett and David Walter Cottrell, Avonmouth, England, assignors to Imperial Smelting Corporation (N.S.C.) Limited, London, England, a British company
No Drawing. Filed Feb. 19, 1965, Ser. No. 434,128
Claims priority, application Great Britain, Feb. 26, 1964, 7,932/64
Int. Cl. C07c 25/04
U.S. Cl. 260—650   2 Claims This invention relates to the fluorination of organic halogen compounds and more especially to a process for the production of highly fluorinated aromatic compounds by the replacement of higher halogen atoms in halogeno-aromatic compounds by fluorine atoms.

Aromatic halogenocarbons containing carbon and halogen atoms only can be reacted with alkali fluorides under various conditions to give yields of halofluoro-aromatic compounds. However, where high yields of highly fluorinated aromatic compounds are required, this process suffers from disadvantages in that drastic reaction conditions and expensive fluorinating reagents are necessary. For example, in the reaction of hexachlorobenzene with alkali metal fluorides to give hexafluorobenzene, the better yields of hexafluorobenzene are only obtainable by the use of the more expensive inorganic fluorides, e.g. caesium fluoride or by high temperature conditions coupled with long reaction times using potassium fluoride. The rates of the reactions concerned appear to limit the yields of highly fluorinated aromatic compounds obtainable under milder conditions and for shorter reaction times.

We have now discovered that if the fluorinating agent is modified by the inclusion of a fluoride chosen from the group comprising fluorides of elements having a valency of between 2 and 6 inclusive, such fluorides being derived from the stable valency states of the elements concerned, then enhanced yields of highly fluorinated aromatic compounds can be achieved using much milder reaction conditions and shorter reaction times.

The invention consists in a process for fluorination of organic halogen compounds in which (a) a mono-valent ionic fluoride, such as an alkali metal fluoride, together with (b) one or more fluorides of elements having a valency from 2 to 6, present in their stable valency states are contacted with the organic halogen compounds preferably in a vapour phase reaction.

The invention further consists in a process for the production of highly fluorinated aromatic compounds in which an aromatic compound containing carbon and halogen atoms only is contacted with a mixture of inorganic fluorides comprising (a) a monovalent ionic fluoride and (b) one or more fluorides of elements having a valency from 2 to 6, present in their stable valency states (so that the said fluorides have no oxidising properties when used in accordance with the invention).

The monovalent ionic fluoride may be an alkali metal fluoride such as LiF, NaF, RbF, CsF, etc. The other fluoride may conveniently be added to the reaction mixture in the form of the alkali metal salts of the corresponding fluoro-anions. Thus, for example, $BF_3$ may be added as $KBF_4$, $SnF_4$ may be added as $K_2SnF_6$. Other complex salts which may be used according to the invention are $NaBF_4$, $KPF_6$, $K_2TiF_6$ or $K_2SiF_6$.

The presence in the reaction mixture of the two fluorides, or the complex fluoride enables better yields of highly fluorinated products to be obtained under less severe reaction condions, markedly increases the amount of fluorination reagent reacted under otherwise similar conditions and enables the fluorination reaction to be carried out (for the same yield of product) at a lower temperature with the consequent use of less costly materials and techniques of reactor construction. The presence of the fluorides enables the vapor phase reaction to be carried out (for the same yields) at lower pressure than the pressure involved in the reactions using only the alkali metal fluorides as proposed hitherto. The further possibility of using a continuous flow apparatus such as a fluidised reactor will be apparent to those familiar with the art. The presence of the two fluorides or complex fluoride enables a lower temperature to be employed than was hitherto believed to be necessary, with a consequent reduction in the extent of thermal degradation. Low thermal degradation is a considerable advantage in that the reduction in the amount of tar-like degradation product facilitates the regeneration of the inorganic residues containing metal chloride plus unreacted metal fluoride, into metal fluoride. This regeneration of the alkali metal fluoride is readily achieved by the use of hydrogen fluoride as a source of fluorine. Thus, the process including the regeneration is a further feature of the invention.

It will be a convenient aid to understanding this invention if previous work of the same applicant is considered.

This earlier work consisted of a process for the production of aromatic perhalogenocarbons containing fluorine atoms attached to the aromatic nucleus in which an aromatic compound containing carbon and halogen atoms only including at least one halogen atom other than fluorine is heated with at least one dry monovalent metal fluoride in the absence of solvents and at a temperature between 300 and 750° C.

The metal fluoride used was preferably pelleted, or used in the form of a powder. The reactions could be carried out at sub-atmospheric, atmospheric or super-atmospheric pressures but pressures in the range of 10 to 50 atmospheres are preferred. Flow systems might be used but sealed pressure vessels, e.g. autoclaves, were the preferred apparatuses for carrying out this process.

Within the broad scope of that invention there were preferred conditions for certain types of starting material.

In one particularly valuable form of the earlier proposals the aromatic compound used was a perhalocompound of formula $C_6Cl_6F_{6-n}$ where $n$ is an integer from 1 to 6 inclusive. In this case the metal fluoride is preferably caesium, rubidium or potassium fluoride or their mixtures, and the temperature may lie between 350° C. and 650° C. However, other sub-groups of fluorides and preferred temperature ranges were shown to be valuable.

(a) in which $n$ was an integer from 3 to 6 inclusive; the metal fluoride used was potassium fluoride; and the temperature was between 400° C. and 600° C.

(b) in which $n$ was 1 or 2; the metal fluoride was potassium fluoride; and the temperature was between 400° C. and 600° C.

(c) in which the metal fluoride used was potassium fluoride; the temperature was between 500° C. and 600°

C.; and the pressure was between 20 and 50 atmospheres.

(d) in which $n$ was between 2 and 6 and the metal fluoride used was sodium fluoride.

(e) in which $n$ was between 2 and 6; the metal fluoride used was sodium fluoride; and the temperature was between 450° C. and 600° C.; preferably the pressure was between 20 and 50 atmospheres.

Examples 1 to 4

8.0 g. hexachlorobenzene were heated for 10 hours at 500° C. with (1) potassium fluoride, (2) potassium fluoborate, (3) and (4), a mixture of potassium fluoride with potassium fluoborate. The results show that the mixture of the two salts gave a significantly greater yield of hexafluorobenzene than either salt alone.

| No. | $C_6Cl_6$, g. | KF, g. | $KBF_4$, g. | $C_6F_6$, g. | $C_6ClF_5$, g. | $C_6Cl_2F_4$, g. | $C_6Cl_3F_3$, g. | $C_6Cl_4F_2$, g. | $C_6Cl_5F$, g. | $C_6Cl_6$, g. |
|---|---|---|---|---|---|---|---|---|---|---|
| 1 | 8.0 | 12.7 | 0 | 0.66 | 1.9 | 2.0 | 1.0 | 0.04 | 0 | 0 |
| 2 | 3.0 | 0 | 7.7 | 0 | 0 | 0 | 0 | 0.02 | 0.24 | 1.1 |
| 3 | 8.0 | 12.2 | 0.25 | 1.5 | 1.7 | 1.4 | 0.7 | 0.04 | 0 | 0 |
| 4 | 8.0 | 12.3 | 2.5 | 2.5 | 1.4 | 0.4 | 0.25 | 0.07 | 0 | 0 |

(f) in which $n$ was between 4 and 6; the metal fluoride used was lithium fluoride; and the temperature was between 450° C. and 600° C.

In another form of the earlier invention the aromatic compound was a perhalogenobenzene of formula $C_6Br_nF_{6-n}$ where $n$ is from 1 to 6 inclusive, and the temperature was between 350° C. and 550° C.

In yet another form of the earlier invention the aromatic compound used was a perhalogenonaphthalene of formula $C_{10}Cl_nF_{8-n}$, is between 1 and 8 and the temperature is between 300° C. and 550° C. Preferably in this case the alkali metal fluoride used was caesium, rubidium, potassium or sodium fluoride or mixtures thereof and the temperature is between 400° C. and 500° C.

In another useful sub-division of the process the alkali metal fluoride used was sodium or potassium fluoride or mixtures thereof and the temperature was between 400° C. and 500° C.

In a still further form of the earlier invention the aromatic compound used was a perhalogeno biphenyl of formula $C_{12}Cl_nF_{10-n}$, where $n$ is from 1 to 10 inclusive.

While this earlier work in itself forms no part of the present invention, it is instructive to realise that by the addition of the complex fluoride (or fluoride mixture) the temperature (for the same yield in the same reaction) can be for instance about 50° and 100° C. less, and the pressure can also be reduced, the reaction in some cases even giving a significant yield at atmospheric pressure.

The highly fluorinated products obtained by the application of this invention are of importance as thermally stable, non-inflammable materials of value as heat transfer media and as working fluids for use in heat engines.

They are also valuable as chemical intermediates for the formation of polymers and other materials of great resistance to heat and ionising radiations and thus useful in the construction of chemical plant and nuclear reactors etc. The invention will be further described with reference to the following examples:

Examples 5 and 6

8.0 g. hexachlorobenzene were heated for 10 hours at 500° C. with sodium fluoride (Example 5) and a mixture of sodium fluoride with sodium fluoborate (Example 6). The results show a greater extent of fluorination in the presence of the mixture.

| No. | $C_6Cl_6$, g. | NaF, g. | $NaBF_4$, g. | $C_6F_6$, g. | $C_6ClF_5$, g. | $C_6Cl_2F_4$, g. | $C_6Cl_3F_3$, g. | $C_6Cl_4F_2$, g. | $C_6Cl_5F$, g. | $C_6Cl_6$, g |
|---|---|---|---|---|---|---|---|---|---|---|
| 5 | 8.0 | 9.0 | 0 | 0 | 0 | 0.06 | 0.9 | 2.5 | 2.2 | 0.5 |
| 6 | 8.0 | 9.0 | 1.2 | 0 | 0.02 | 0.4 | 1.8 | 2.5 | 1.5 | 0.3 |

Examples 7 to 12

8.0 g. of hexachlorobenzene were heated with approximately 12 g. of potassium fluoride at 500° for 10 hours. The addition to the reaction mixture of the compounds named in column 4 causes significantly increased extents of fluorination:

| No. | $C_6Cl_6$, g. | KF, g. | Complex salt, g. | $C_6F_6$, g. | $C_6ClF_5$, g. | $C_6Cl_2F_4$, g. | $C_6Cl_3F_3$, g. | $C_6Cl_4F_2$, g. | $C_6Cl_5F$, g. | $C_6Cl_6$, g |
|---|---|---|---|---|---|---|---|---|---|---|
| 7 | 8.0 | 12.6 | None | 0.7 | 2.1 | 2.0 | 0.9 | 0.03 | 0.01 | 0.01 |
| 8 | 8.0 | 12.2 | $KPF_6$, 2.1 | 2.5 | 1.6 | 0.8 | 0.4 | 0.03 | 0.01 | 0.01 |
| 9 | 8.0 | 12.9 | $SbF_3$, 0.4 | 1.2 | 1.6 | 1.2 | 1.1 | 0.06 | 0.03 | 0.02 |
| 10 | 8.0 | 12.5 | $K_2TiF_6$, 2.7 | 2.5 | 1.7 | 0.5 | 0.1 | 0.01 | 0.01 | 0.00 |
| 11 | 8.0 | 12.2 | $K_2SnF_6$, 3.5 | 1.9 | 1.9 | 0.8 | 0.3 | 0.04 | 0.02 | 0.01 |
| 12 | 8.0 | 12.4 | $K_2SiF_6$, 2.5 | 1.0 | 2.2 | 1.8 | 0.6 | 0.03 | 0.01 | 0.01 |

As will be noted from the preceding examples, the maximum molar ratio of complex fluoride to alkali metal fluoride is about .094 to 1. The hexachlorobenzene is in the vapor phase and the mixture of fluorides is in the solid state during the reaction.

Various modifications may be made within the scope of the invention. Thus, the process according to the invention is also useful for the fluorination of other organic halogen compounds which are capable of fluorination by means of ionic metal fluorides but in which present yields are low, due to the thermal degradation caused by the high reaction temperatures required.

We claim:
1. A process for the production of fluorinated benzenes in which hexachlorobenzene is heated in contact with a mixture of:
  (a) KF or NaF, and
  (b) at least one fluoride selected from the group consisting of
   (i) $SbF_3$, and
   (ii) a fluoride containing an alkali metal and a nonalkali metal moiety selected from the group consisting of $BF_4$, $SnF_4$, $SnF_6$, $PF_6$, $TiF_6$ and $SiF_6$ at a temperature such that hexachlorobenzene is in the vapor phase, the mixture of fluorides being in the solid state during the reaction, to produce a halogenobenzene containing a greater number of fluorine atoms than the starting material, the maximum molar ratio of (b) to (a) being about .094 to 1.

2. A process as defined in claim 1 in which the fluoride is subsequently regenerated by hydrogen fluoride.

References Cited

UNITED STATES PATENTS

| | | |
|---|---|---|
| 3,277,192 | 10/1966 | Fielding. |
| 3,300,537 | 1/1967 | Bennett et al. |
| 2,004,931 | 6/1935 | Daudt et al. _____ 260—650 |
| 2,757,214 | 7/1956 | Muetterties _____ 260—653.8 |
| 3,231,625 | 1/1966 | Nyman. |

LEON ZITVER, *Primary Examiner.*

H. T. MARS, *Assistant Examiner.*